(12) United States Patent
Schoch et al.

(10) Patent No.: US 12,399,488 B2
(45) Date of Patent: Aug. 26, 2025

(54) MODULAR AUTOMATION SUPPORT SYSTEM

(71) Applicant: ABB Schweiz AG, Baden (CH)

(72) Inventors: Nicolai Schoch, Heidelberg (DE); Katharina Stark, Weinheim (DE); Mario Hoernicke, Landau (DE)

(73) Assignee: ABB Schweiz AG, Baden (CH)

( * ) Notice: Subject to any disclaimer, the term of this patent is extended or adjusted under 35 U.S.C. 154(b) by 474 days.

(21) Appl. No.: 17/884,728

(22) Filed: Aug. 10, 2022

(65) Prior Publication Data

US 2023/0047304 A1    Feb. 16, 2023

(30) Foreign Application Priority Data

Aug. 13, 2021   (EP) ..................................... 21191315

(51) Int. Cl.
*G05B 19/418*    (2006.01)
*G05B 13/04*    (2006.01)

(52) U.S. Cl.
CPC . *G05B 19/41885* (2013.01); *G05B 19/41845* (2013.01); *G05B 13/04* (2013.01)

(58) Field of Classification Search
CPC ........ G05B 19/41885; G05B 19/41845; G05B 13/04
USPC ........................................................ 700/28
See application file for complete search history.

(56) References Cited

U.S. PATENT DOCUMENTS

| 11,409,924 B2 * | 8/2022 | Sharma ................... G06F 30/20 |
| 2008/0097941 A1 * | 4/2008 | Agarwal ................ G06N 20/00 |
| | | 706/12 |
| 2022/0121181 A1 * | 4/2022 | Sobalvarro ........ G05B 19/4188 |

FOREIGN PATENT DOCUMENTS

| CN | 109241524 A | 1/2019 |
| CN | 109791642 A | 5/2019 |
| EP | 3686698 A1 | 7/2020 |
| KR | 2185433 B1 * | 12/2020 |
| WO | WO-2020053991 A1 * | 3/2020 ....... G06Q 10/06313 |

OTHER PUBLICATIONS

Eilermann, Martin, et al. "A general approach to module-based plant design." Chemical Engineering Research and Design 137 (2018): 125-140. (Year: 2018).*

Schindel, et al. "General approach for technology and Process Equipment Assembly (PEA) selection in process design." Chemical Engineering and Processing-Process Intensification 159 (Feb. 2021). (Year: 2021).*

Eilermann et al., "A general approach to module-based plant design," *Chemical Engineering Research and Design*, 137: 125-140 (Sep. 2018).

(Continued)

*Primary Examiner* — Mohammad Ali
*Assistant Examiner* — Joshua T Sanders
(74) *Attorney, Agent, or Firm* — Leydig, Voit & Mayer, Ltd.

(57) ABSTRACT

A modular automation support system for modular plants comprises an automation engineering support system comprising a feedback processing component configured to modify the operation of one or more other components of the automation engineering support system based on user feedback.

13 Claims, 8 Drawing Sheets

(56) References Cited

OTHER PUBLICATIONS

Schindel et al., "General approach for technology and Process Equipment Assembly (PEA) selection in process design," *Chemical Engineering & Processing-Process Intensification*, 159(2021): 108223, 22 pp. (Feb. 2021).
European Patent Office, Extended European Search Report in European Patent Application No. 21191315.7, 9 pp. (Feb. 10, 2022).

\* cited by examiner

MODULAR AUTOMATION SUPPORT SYSTEM

CROSS-REFERENCE TO RELATED APPLICATIONS

This patent application claims priority to European Patent Application No. 21191315.7, filed on Aug. 13, 2021, which is incorporated herein in its entirety by reference.

FIELD OF THE DISCLOSURE

The present disclosure relates to a modular automation support system for modular plants.

BACKGROUND OF THE INVENTION

The Modular Type Package (MTP) standard in the field of modular automation systems creates a framework for interoperability between modules and the orchestration system, allowing industrial process plants to be built up and engineered in a modular way during an automation engineering phase, with the goal of simplifying the automation engineering. These advantages are realized by prefabricated and well-tested modules, called PEAs (Process Equipment Assembly), that can easily be put together in different combinations so that different recipes can be realized.

Systems exist that provide the plant owner with support during the automation engineering phase. These, however, may not always comprehensively account for all circumstances that occur in real plant environments. Moreover, few solutions are available to provide support during the control engineering phase, i.e., during plant operation and production planning.

BRIEF SUMMARY OF THE INVENTION

There is therefore a need for more effective modular automation support systems for modular plants. This need is met by the modular automation support system as described and claimed herein. Optional features are set forth by the dependent claims. Corresponding methods including computer-implemented methods are also provided.

According to another aspect, there is provided a computing device comprising a processor configured to perform computer-implemented methods as described herein.

According to a further aspect, there is provided a computer program product comprising instructions which, when executed by a computing device, enable/cause the computing device to perform computer-implemented methods as described herein.

According to a yet further aspect, there is provided a computer-readable medium comprising instructions which, when executed by a computing device, enable/cause the computing device to perform computer-implemented methods as described herein.

There is also provided a modular plant comprising any of the systems described herein, along with a method of operating a modular plant, comprising performing any of the methods described herein.

The invention may include one or more aspects, examples or features in isolation or combination whether or not specifically disclosed in that combination or in isolation.

These and other aspects of the invention will be apparent from and elucidated with reference to the embodiments described hereinafter.

BRIEF DESCRIPTION OF THE SEVERAL VIEWS OF THE DRAWING(S)

A detailed description will now be given, by way of example only, with reference to the accompanying drawings.

DETAILED DESCRIPTION OF THE INVENTION

Modular Automation Support System

Figure 1:
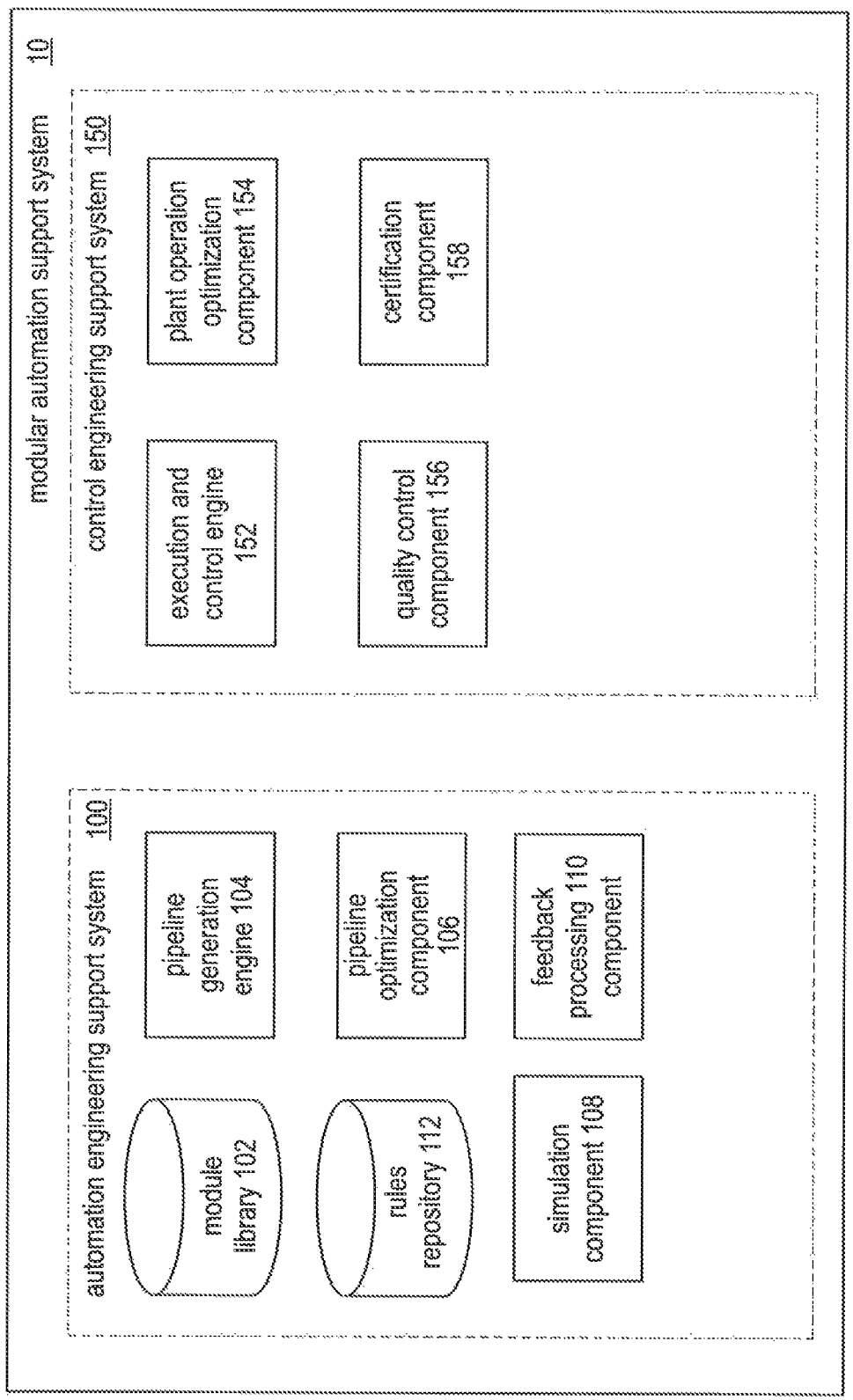
FIG. 1 illustrates a modular automation support system according to the present disclosure.

FIG. 1 illustrates a modular automation support system 10 for modular plants. The modular automation support system 10 comprises one or more of an automation engineering support system 100 (for providing support to an automation engineer) and a control engineering support system 150 (for providing support to a control engineer). The modular automation support system 10 may be implemented in software, firmware, hardware, or any combination thereof, for example using the computing device described herein with reference to FIG. 8. The modular automation support system 10 may form part of, or comprise, an engineering tool or dashboard for planning, configuring, administering, and/or operating modular plants. Automation Engineering Support System The automation engineering support system 100 comprises one or more of the following components: (i) a module library 102 comprising semantically annotated modules; (ii) a pipeline generation engine 104; (iii) a pipeline optimization component 106; (iv) a simulation component 108.

Semantic Data Model

As described further below, the modular automation support system 10 implements a semantic data model to provide for abstract representations of modules, module pipelines, or modular plants.

The module library 102 contains one or more semantic modules stored in a repository such as a database. A semantic module comprises instance data representing, describing, or defining a module for a modular plant using the semantic data model. The semantic module may also be described as a module representation, module description, or module definition. In the context of the present disclosure, the terms "module" and "unit" may be used interchangeably. The module library 102 may store further heterogeneous data items (such as specifiers, annotations, values, history records) relating to the semantic modules. The module library 102 thus serves as a place (or knowledge representation system) for gathering global and local domain knowledge regarding modules. The module library 102 may be implemented using a database involving any centralised or distributed data storage. For example, one or more data storage units provided by the automation engineering support system 100, by the modules themselves, or by other elements of the modular plant, may be used to implement the database. In particular, the data storage 808 described below may be used to implement the database. The semantic modules stored in the module library 102 may represent modules which are real or virtual, owned (in the possession of the plant operator) or not yet owned (e.g. available for purchase), available (currently being used in a plant) or potentially available. Thus provided is a pool or repository of modules which may be described as a smart unit pool. By creating the semantic modules and storing and registering them in the module library 102, it is possible to search for and discover the semantic modules later and to select modules to be composed into process pipelines. In particular, to assist the plant operator in locating appropriate modules, the module library 102 may provide search functionality.

The term "virtual module" as used herein refers to a type or class of modules, whereas the term "real module" refers to an instance of a module of a particular type. A real module may be implemented in software, firmware, hardware, or any combination thereof. A software module providing a control configuration for a hardware module may be referred to as a "function module". For a virtual module, the semantic module may be implemented as a template for a module of a particular type, such as a heating module, dosing module, mixing module, and so on. The template may comprise fields holding fixed values which are valid for all modules of the particular type. The template may further comprise one or more placeholders for values that may be set for real modules, and/or one or more pre-set values which may later be altered. For a real module, the semantic module may comprise the template for the relevant module type but supplemented with one or more values representing the real module. In this way, the template accommodates process knowledge or engineering knowledge via the fields in the template.

Thus, modules are described using a semantic description which accords to the semantic data model. The semantic description may specify any one or more module attributes of the module. The module attributes (which may also be referred to as annotations, properties, characteristics, specifiers, or features) may comprise any suitable data describing the module. For example, the semantic description may describe the module in terms of module attributes comprising one or more of: input/output attributes, module functionality; module components; module parameters; module usage; process parameters; calibration parameters; data input to, processed by, and output from the module. The semantic description provides a common interface that holds to the Semantic Web Stack (i.e. RESTful APIs, accessible via HTTP, etc.). Via matching of semantic descriptions between modules, process pipelines may be manually or automatically generated, as described in more detail below. The semantic description may further comprise prior configuration data relating to a configuration of the respective module in at least one prior modular plant, the prior configuration data being usable for configuring the module for use in a further modular plant. The prior configuration data may relate to prior engineering data expediting reuse of the module.

The semantic description may specify relationships between inputs and outputs of the module. In particular, the semantic description may specify one or more preconditions and one or more postconditions of the module. Preconditions and postconditions specify conditions which can, should, or must exist at the inputs to and outputs from the module. A precondition may be described in terms of an input attribute or characteristic while a postcondition may be described in terms of an output attribute or characteristic. Preconditions and postconditions may for example specify attributes such as material identities or material states which are input to and output from a module, respectively. The module may thus transform at least one precondition into at least one postcondition. In material processing, for example, a precondition may be an educt and a postcondition may be a product. By "educt" is meant any substance, composition or material which is to be reacted with at least one other educt to form a product. The module thus transforms the educts into the product, i.e. the material identity is transformed. The module may transform one material state into another material state for example via heating, stirring, refining, and so on. By "state" is meant herein any property, characteristic, or condition of a single material and not just the state of aggregation. The semantic description may further specify one or more conditions or constraints under which the module transforms the precondition into the postcondition. Additionally or alternatively, preconditions and postconditions may specify one or more of the form, structure, or connection modality of the inputs and outputs of the module.

For a real module, the semantic description may further comprise collected usage data relating to prior use of the real module in a modular plant. The collected usage data may comprise any suitable data characterizing prior module performance, usage or configuration. The collected usage data may for example comprise any one or more of prior engineering data; prior calibration parameters; frequent plant contexts; maintenance performed; materials/medium processed; application purpose and restrictions for chemical reactions. The collected usage data may be usable for expediting the configuration of the module for use in a further modular plant. For example, one value in the template for the real module may identify the last material processed (e.g. nuts, which may be important for plants that process grocery but that want to also produce grocery for people with nuts allergy). Another value may identify non-functional services of the real module (e.g., for an oven module, a value indicating "Service FanOven broken, but Top&BottomPlateHeat Baking still possible").

The collected usage data may comprise performance data. For example, the collected usage data may comprise one or more previously measured key performance indicators (KPIs). KPIs that may be measured may comprise for example one or more of: mean time between failure; uptime; utilization of services and equipment; availability schedule; maintenance cycles/intervals. Many other examples will be known to the person skilled in the art. Such performance data may be useful for optimizing the selection of modules for pipelines, as described further below.

The semantic data model provides a common or standardised vocabulary or ontology (connecting vocabulary with pre-existing knowledge and rules) for describing modules, module pipelines, and modular plants, as will now be described. The semantic data model may also be described as a conceptual or abstract data model. The semantic data model structures data in a specific logical way using semantic information that adds meaning to the data and the relationships that exist within the data.

"Semantic data" as used herein is abstract data which can represent any attribute of a module, pipeline, plant, or material, in particular, input/output attributes of modules expressed in terms of material identity (e.g. input/output materials) or material state (e.g. material in a raw state or in a refined state, cooled or heated, liquid or solid). The semantic data may represent entities at different levels of abstraction. For example, at the highest data abstraction level, semantic data may represent attributes such as: functionality; material; signal; energy; information; module specification, among others. At a lower level, semantic data may represent attributes such as: power; capacity; temperature e.g. optimal temperature; material identifier; material features; durability; heat transfer; input tube diameter; tank capacity; max reactor pressure; max capacity, among others.

An instance of semantic data may comprise one or more attributes that are encoded by means of an n-dimensional vector or condition vector. In one example, steel in solid state with specific extra-high durability is represented as:
zeroth dimension: type of attribute: "material"=0
first dimension: material: "steel"=76,
second dimension: aggregate-state: "solid"=3,
third dimension: durability: "extra-high"=10, yielding the vector [0,76,3,10].

A purification process module might require steel as input. Specifically, it might require, as the precondition, liquid steel: [0,76,2, -], where "2 " represents aggregate-state: "liquid" and "-" in the third dimension signifies no requirements with respect to the durability attribute. Hence, a determination may readily be made that the given steel [0,76,3,10] does not match the precondition [0,76,2, -] of the module. Thus, the process pipeline would require a preceding melting module that melts the solid material in order to transform the solid steel [0,76,3,10] into liquid steel [0,76,2,10], so as to match the precondition of the purification process module, [0,76, 2, -]. Specifically, the melting module should have the precondition: [0, -, 3, -] and the postcondition: [0, -, 2, -]. In this example, only four dimensions are specified, but of course it is possible to specify more or fewer attributes as conditions or restrictions, such as input tube diameter, pressure of the liquid that flows in, etc.

In another example comprising a cake bakery plant, white and black dough (educts) can be processed in order to yield marble cake (product). Here, the material white dough in rationed state might be represented by [0,1,1,1], with 0 for material, 1 for dough, 1 for white (dough), 1 for rationed state, and the material black dough in rationed state might be represented by [0,1,2,1], with 0 for material, 1 for dough, 2 for black (dough), 1 for rationed state. Both are processed separately and stirred white dough [0,1,1,2] as well as stirred black dough [0,1,2,2] is obtained (where the last component with value 2 represents "stirred" state of the dough. Next, these two are merged and baked together, which yields a ready-to-eat cake [0,63, -,-, 1,10], where 0 stands for material, 63 encodes "cake", two blank dashes say that the state and color is not defined, 1 stands for type of cake: "marble cake", and 10 stands for "extremely hot".

Similarly, chemical or physical processes including reacting ingredients, side conditions like temperature or pressure, etc., can entirely be described by means of abstracted condition vectors.

The semantic data model implemented by the modular automation support system 10 defines the meaning of individual components in the n-dimensional vector as well as the order in which the components appear, to provide consistency between different instances of semantic data. In one example, the first dimension may describe the overall context, such as: material/function/information flow/energy flow. The second and following dimensions may include further attributes according to their level of abstraction and statistical importance. In one example, attributes may be specified in the order: steel, heating, value propagation, heat transmission.

The semantic data model may extend the n-dimensional condition vector by implementing linked conditions, for example by means of (inner or outer) vector products or cross products. In one example, in which raw hot steel is processed into refined hot steel, not only the material component is important, but also the heat transfer that takes place, since the steel is to remain hot. Here, both material and heat transfer may be represented via the condition vector and, since they impact each other, furthermore via a vector product.

Based on the defined order of components in the condition vectors, the automation engineering support system 100 may prioritize one component over others, for example in the pipeline generation algorithm, as described further below.

Furthermore, the semantic data model may define a semantic plant schema in which at least one attribute represented by a component of the n-dimensional vector defines a restriction or range, e.g., a [min/max] value, or an [operatingPoint+/−epsilon] value. The restriction may be represented by means of a function of further parameters, e.g. min-max-pressure p depending on temperature: p_min/max=f(temp). The restriction can automatically be obtained from plant specification documentation, for example an MTP file, or may be provided by the plant operator or a plant engineer. The schema definition may facilitate high-level schema validation as well as module control.

Furthermore, the semantic data model may provide for semantic description of modules specifying multiple services provided by a module, and/or nesting of modules (a module within a module, for example a stirring module within a heating module).

The modular automation support system 10 is thus configured to implement a semantic data model providing for one or more of the following: modelling pre- and postconditions with one or more attributes, each with optional further annotations, optionally recursively; matching of pre- and postconditions. optionally with multi-index components and annotations; feeding forward/backward of pre- and postcondition (e.g. if a stirring module requires, as precondition, rationed components at a temperature of 45 degrees, feeding this back to the preceding heating module to be set as the goal temperature).

In this way, a semantic module is able to consume and produce semantic data using the semantic data model, as described above. The semantic data is available in the semantic plant process context and is processed/manipulated but remains available (possibly in a different state (raw of refined oil) or with different annotations (hot or cooled down) within this semantic plant process context.

The semantic description of plant equipment such as a module may build upon information available from documentation pertaining to that plant equipment. For example, for a module, a standard description file such as an MTP defining the associated module may be available. The semantic description for the module may comprise information taken from the documentation and translated so as to accord to the semantic data model. However, it will be understood that the semantic description disclosed herein may be based on standards other than MTP. The MTP can be seen as a type description which specifies the building plan of the module. The MTP specifies, for example, module I/O (information-tech-wise, material-tech-wise; each with name and ID), module topology, HMI, state machine (this may be the same for all MTPs but with services indicating which states are in fact used), services (names only), and recipes. The module provider, however, does not necessarily know anything about the application or plant process in which the module can be used. Hence the MTP does not provide description fields for all attributes that are of interest to the plant operator. Thus, to cover process knowledge, and to provide standardized vocabulary to describe this process knowledge, the module library 102 wraps or extends the MTP with a wrapper comprising an extended semantic description of the module.

Figure 2:
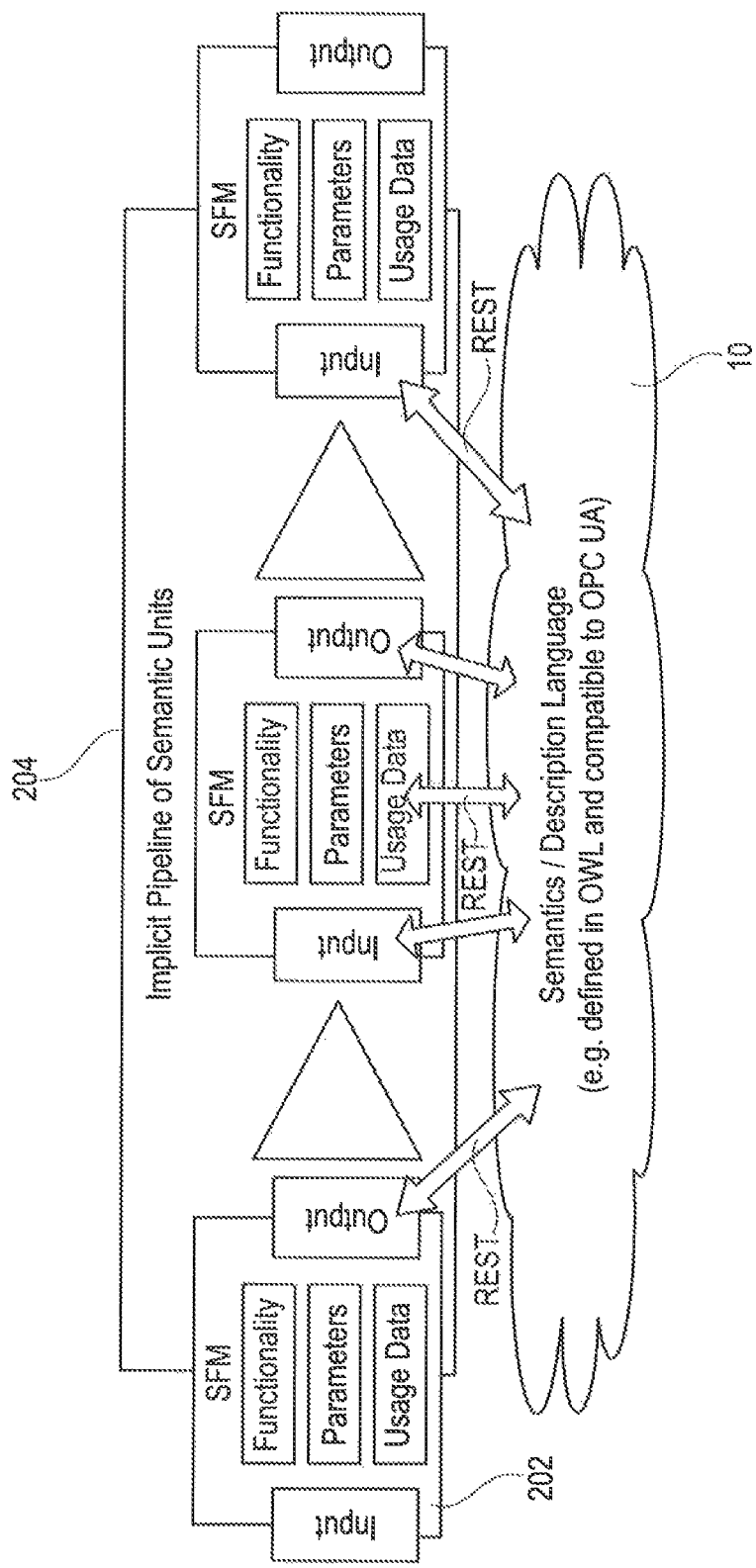
FIG. 2 illustrates a semantic pipeline representing a physical pipeline for an industrial modular plant via a sequence of interconnected semantic modules in accordance with the disclosure.

FIG. 2 illustrates a number of semantic modules 202 which have been assembled to form a semantic pipeline 204. Here, a "semantic pipeline" may be understood as instance data describing a pipeline of one or more semantic modules using the semantic data model, and may also be referred to as an "implicit pipeline", "pipeline representation", "pipeline description", or "pipeline definition". Each semantic module 202 may be based on a standard description file (in one non-limiting example, the MTP) for the module 202. The module library 102 comprises a semantic control layer which extends the MTPs with a wrapper comprising the extended semantic description of the modules according to the semantic data model. The underlying MTP is hidden and not necessarily directly accessible. The semantic description is machine-readable and machine-processable. The semantic description as shown in FIG. 2 extends the MTP by including, among others, the following attributes: input/output attributes, functionality, parameters, and collected usage data. It will be however be understood that this arrangement is not intended to be limiting. The semantic description may further extend the MTP by including mappings to, for example, the Asset Administration Shell (AAS) IEC-63278-1 ACD, ISO-15926, IEC-62424, Blanco-XML, PA-DIM. The semantic description may further extend the MTP by including a set of base operations as defined for example in SkaMPi (VDI Richtlinie 2776). SkaMPi comes with 15 base operations (Grundoperationen) that describe Services (e.g. homogenize/"Homogenisieren", heating/"Heizen", dosing/"Dosieren", etc.) along with their typical process-technical attributes (e.g. pressures, volumes, currents, pressure gradients, heating power, precision, concentration, etc.) for comparison and consistency between process requirements and FEA/PEA capabilities. Also, the parameters and set-points for these base operations can be relevant in order to link and check the base operations in one module with respect to those in another module, e.g. parameters, values, min-max-values, etc. These may be used to describe more complex module services/functionalities, e.g., as a chain of subsequent base operations. For instance, a high-temperature-mixing module can be represented as a chain of heating and mixing base operations.

In one exemplary semantic description of a module which comprises a tank, the MTP contains the input/output features of the tank and describes the functionality of the tank in terms of its storage capacity for liquids, while the extended semantic description covers other aspects such as pressure limits, min/max temperatures, other tolerance boundaries, and so on.

In another exemplary semantic description of a module comprising a reactor, the MTP allows inputs and outputs to be defined, while the extended semantic description defines the ratio of e.g. two inputs $H_2$ and $O_2$ (e.g. $\frac{2}{3}$ $H_2$ and $\frac{1}{3}$ $O_2$) which are to be reacted in the reactor, and optionally also the required/optimal reaction temperature and pressure (along with potentially critical values/thresholds). Moreover, the semantic description may further specify that the tubes that connect this reactor to possible other previous or subsequent units in a pipeline have a diameter of 0.5 meters, such that a translation flange is required in case the connecting unit has input/output tubes with a diameter of only 0.25 meters.

The extended semantic description may differentiate between continuous process and batch process unit: for example, a batch process module might process 100 L of liquid per execution, vs. a continuous process module that processes 100 L of liquid per hour, and hence has to be (continuously) provided with liquid in order avoid downtime.

As will be described in more detail below, the semantic description enables—among other possibilities—semantic module-to-module-matching (pipeline generation), sanity checks useful for pipeline generation, plant process simulation (i.e. providing the initial inputs and obtaining the simulated final outputs to determine whether the plant functions as intended), plant- and module-based optimization, and calibration and automation (for example to find bottlenecks, e.g. what happens if Module 1 connected to Module 2 is set to produce a higher output such that Module 2 reaches or overruns its tolerance boundary and enters a critical state).

The module library 102 assists the plant operator in administrating/managing their stock of existing modules (e.g. 12 dosing and 10 reaction units, and so on). Some modules might currently be used in the plant while others are not. For those being used, data may be collected relating to their usage (e.g. what materials are processed), or their components' performance (e.g. uptimes, attrition of valve materials), their maintenance key performance indicators (KPIs, e.g. module life cycle), and so on, and continually added to the database. When a new plant is to be built, or when the existing plant is to be reconfigured, the plant operator may view the module library 102 and select the optimal module for a given functionality, with reference to the semantic description including collected usage data. For example, the plant operator may simply select the one available module that processed the same material that the sought module is expected to process and that has the longest time until the next scheduled maintenance.

Using the module library 102, plant operators are able to select and directly re-use pre-defined (preconfigured), existing modules from the pool and thus decrease the required engineering efforts. In this way, re-use is facilitated not only of individual modules but also of larger functional blocks, simplifying the tasks of the engineering of modules and of the assembly of modular plants.

Moreover, where the real version of a module is not yet available in the pool, the system 100 may provide functionality allowing the plant operator to ascertain by means of virtual modules in the pool whether a particular pipeline could be assembled for a given new plant. By providing the semantic description of the modules, a mechanism is provided for manually and/or automatically finding and recommending feasible or optimal modules and pipeline compositions for a newly-to-be-planned modular plant. These recommendations may be based not only on compatibilities of the modules determined via the semantic description but also on specific optimization criteria, as explained further below.

Hence, module-based virtual engineering of plant processes is hereby provided. The module library 102 thus provides for a smart, information enhanced unit pool for plant operators. This provides the foundation for improved usability and higher comfort in the use of software tools by plant operators, less error-prone unit-in-plant setups and more optimized plant performance. All information within the plant environment may be collected/aggregated in the module library 102, providing one access point and one unified interface to the overall information in the plant context, and thus making the information searchable and revealing optimization potential, while providing the foundation on which further AI-based applications and algorithms e.g. for pipeline generation or optimization may operate.

It will be understood that the examples given herein are for the purposes of illustration only and that numerous forms of semantic description are possible, being dependent on the module being described. In any case, the extended semantic description disclosed herein is provided to cover such engineering knowledge including any or all of the important engineering facts that are useful for the plant operator in order for the unit to be completely semantically describable.

As mentioned above, the automation engineering support system 100 allows the plant operator to select and combine units from the module library 102 to form pipelines. Using the semantic description of the modules provided by the module library 102, the plant operator is able to determine compatibility of the modules according to various module attributes. As shown in FIG. 2, for example, the plant operator selects semantic modules 202 according to the their I/O compatibility to form the semantic pipeline 204 (i.e. a representation of a physical pipeline).

Pipeline Generation Engine

However, as also mentioned above, via the semantic description and collected usage data, a mechanism is provided for automatically finding and recommending (e.g. consistent and optimal) module and process pipeline compositions for the modular plant. To this end, referring again to FIG. 1, the automation engineering support system 100 may further comprise a module pipeline generation engine 104 configured to receive input data indicating at least one precondition and at least one postcondition of a required pipeline for the modular plant, and to generate one or more suggested module pipelines comprising one or more modules capable of transforming the at least one precondition into the at least one postcondition. The pipeline generation engine 104 may also be referred to as a pipeline composition engine. The pipeline generation engine 104 may be configured to select from the module library 102 one or more semantic modules for inclusion in the module pipeline on the basis of the module attributes contained in the semantic descriptions in the module library 102. In particular, the pipeline generation engine 104 may be configured to access the module library 102, in which each semantic module has semantically annotated pre- and postconditions (e.g. educt(s) and product(s)), and determine whether a connection, i.e., a path, can be found/built from the precondition(s) to the postcondition(s) by gradual or incremental processing through a set/chain of modules. For example, each module takes one (or more) input(s) as precondition and transforms it/them into one (or more) output(s) as postcondition, which in turn are then the input(s), i.e. precondition for the next module and which, in turn, processed into the next output(s) i.e. postcondition, and so on. The pipeline generation engine 104 ensures module-to-module and thus pipeline compatibility by definition as it only allows modules to be combined in a row that are compatible according to their semantic description. The generated suggested pipelines may comprise sub-pipelines connected in parallel and/or sequentially.

The present disclosure envisages various kinds of module attribute which may be used for selecting modules.

In particular, the pipeline generation engine 104 may be configured to determine, on the basis of input/output attributes of the semantic modules, a sequence of one or more semantic modules to form the module pipeline in which the input attributes of the first module in the sequence match the at least one precondition and in which the output attributes of the last module in the sequence match the at least one postcondition. The pipeline generation engine 104 may be configured to generate the module pipeline using a plurality of semantic modules selected from the module library 102 to provide intermodular compatibility of the respective modules. The pipeline generation engine 104 may be configured to determine intermodular compatibility on the basis of the respective module attributes. The module attributes indicating intermodular compatibility may comprise the input-output attributes of the selected semantic modules. The pipeline generation engine 104 may thus be configured to select semantic modules for inclusion in the suggested pipeline on the basis of input-output compatibility of the respective modules. In the sequence of modules so determined, the modules are thus selected so that the output attributes of a module match the input attributes of any subsequent module and so that the input attributes of a module match the output attributes of any preceding module. Matching pre- and postconditions and determination of intermodular compatibility is preferably but not essentially performed using the n-dimensional condition vectors, as described above with reference to the semantic data model, optionally using any schema or prioritization implemented by the model.

Additionally or alternatively, the pipeline generation engine 104 may be configured to determine, on the basis of functionality attributes of the modules in the pool, a sequence of one or more modules to form the module pipeline whose functionalities combine to transform the at least one precondition into the at least one postcondition. In this case, attributes indicating intermodular compatibility may comprise attributes defining functionality of the modules, and wherein the module pipeline generation engine is configured to generate the suggested pipeline on the basis of functional compatibility between the selected modules. For example, where one module requires a minimum temperature at the input, the pipeline generation engine may select a heater module as the preceding module in the suggested pipeline. Again, attributes defining functionality of the modules may be compared and matched using semantic data describing those attributes which accords to the semantic data model.

Thus, the pipeline generation engine 104 is configured to use the semantic description of modules provided by the module library 102 automatically to generate suggested pipelines to be provided to the plant operator (who would otherwise have to manually choose, combine and compose modules).

The pipeline generation engine 104 may comprise one or more of: (1) a graph generation and path finding algorithm; and (2) a rule-based algorithm.

The graph generation and path finding algorithm (or graph building algorithm) is configured to connect starting nodes (e.g. the educts of a plant process) to be connected to end nodes (e.g. the products of a plant process). The graph and its nodes represent modules that are connected via edges representing the module-to-module-connections. The algorithm may be used alone or in conjunction with other algorithms in order to accelerate the pre-/postcondition matching by means of restricting the set of modules to be matched. Generally, the algorithm may be configured to perform forward-propagation and/or back-propagation using the pre- and postconditions. Forward-propagation can be performed to build the graph (graph data structure), with edges and nodes that fit for direct further-processing, possibly parallel sub-pipelines that are merged into one, or one pipeline that splits into two or more parallel sub-pipeline, and so on. The algorithm may comprise memory functionality for memorizing processed edges, for example to facilitate selection among alternative compositions. Non-oriented graphs may be supported.

The rule-based algorithm may form part of an expert system or domain knowledge representation system configured to implement expert rules. The rule-based algorithm may use the same vocabulary/ontology as defined by the semantic data model, as described above. The rules may be defined by or may use semantic data according to the semantic data model. Exemplary rules include those requiring the input-output compatibility and functional compatibility described above. Further rules may describe process knowledge or engineering knowhow (e.g. chemical process knowledge, or tube-into-module-flanging engineering knowhow). Further rules may specify e.g. that certain plant processes always require a refinement module, which does not necessarily change the I/O material, but which is required for a higher-quality product result, and specific process technological rules (e.g. that a separator module should separate liquids by means of a distilling process and separate solids by means of a sieve process). Further rules may describe best practises (e.g. well-working sub-pipelines in former plants, well-calibrated modules in former plants, etc.). Further rules may indicate context dependency, for example that a separator module in batch processes transforms solids with a sieve and that a separator module in continuous processes transforms liquids with a distillery. Further rules may indicate permissible and impermissible sub-pipeline-compositions, for example, one rule may state that a baking module is not to be used before a mixing module in a cake-baking pipeline. Further rules may indicate requirements for sequential or parallel processing. For example, for a cake-baking pipeline for producing a marble cake using black and white dough, one rule may indicate that the black and white doughs need to be prepared separately (i.e. in parallel sub-pipelines) until the baking step. The pipeline generation engine 104 may thus comprise a rule-based, data-driven execution engine.

The pipeline generation engine 104 may be configured to execute other data- and knowledge-driven algorithms that support the module pipeline connection process as well as optimization procedures and ranking algorithms, that integrate and process KPIs, module features and all other sorts of available useful data.

Figure 3:
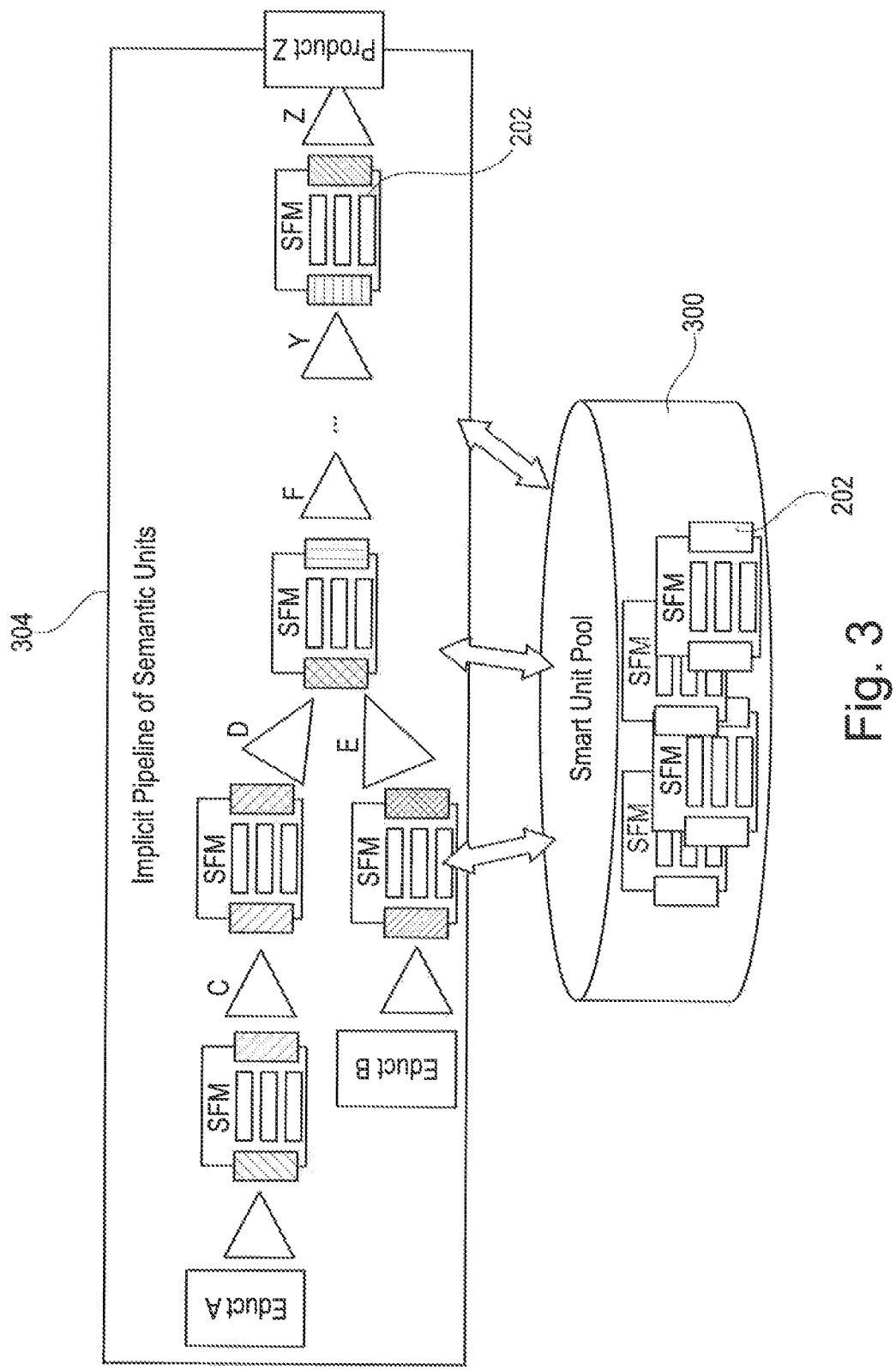
FIG. 3 illustrates a semantic pipeline automatically generated by a pipeline generation engine for transforming particular educts into a given product in accordance with the disclosure.

FIG. 3 shows an automatically-generated suggested semantic pipeline 304 comprising a sequence of semantic modules 202 leading from the given inputs, here "Educt A" and "Educt B", to the required output, "Product Z". Also shown is the smart unit pool 300 provided by the module library 102 from which the semantic modules 202 may be selected. As described above, each semantic module 202 may be based on the MTP for the respective module wrapped by an extended semantic description along with optional collected usage data.

In this example, given the input materials, Educt A and Educt B, the plant operator wants to obtain the output material, Product Z. The plant operator therefore enters the input and output materials into the pipeline generation engine 104 as preconditions and postcondition, respectively. The suggested pipeline 304 for transforming Educts A and B into Product Z is generated by the pipeline generation engine 104 by identifying a selection of semantic modules 202 which, in the particular sequence shown, transform the Educt A into intermediate material C, then into intermediate material D, which is combined with intermediate material E obtained from Educt B to obtain intermediate F, and so on, until Product Z is obtained. The suggested pipeline 304 is based on the semantically represented knowledge of what the underlying modules do, i.e. what inputs they accept and what outputs they produce, or what functionalities they have, as explained elsewhere herein. The pipeline generation engine 104 in this example uses a rule-based, data-driven execution engine which checks compatibilities (for example I/O compatibilities) of the modules, and which runs through the pipeline 304 as the inputs for the next module are determined, until the entire pipeline is automatically generated to process the given input materials towards the requested output material. FIG. 3 further illustrates I/O compatibilities of the modules in the suggested pipeline 304 by using hashing to indicate different I/O attributes of the modules. In this way, the pipeline generation engine 104 simplifies the engineering of plants and reduces engineering efforts.

While the modules in the above example are chained in the pipeline according to I/O compatibility, it will be understood that the pipeline generation engine 104 may be configured to suggest pipelines based upon other attributes (such as functionalities, parameters, and other attributes) that may automatically be chained together in the pipeline, as well as or instead of using compatible I/O processing chains. By leveraging the semantic description, the pipeline generation engine 104 is configured to build pipelines based on any type of module attribute along with respective pre- and postconditions.

As mentioned, one such exemplary attribute is functionality. Hence, the pipeline generation engine 104 can generate a pipeline in terms of a sequence of functionalities in order to reach the overall functionality of the planned pipeline. In another example, only one material X is to be processed within a newly-to-be-generated process pipeline from an initial raw state into a final refined state (while the identity of the material remains substantially unchanged as material X). The pipeline generation engine 104 is configured to generate a pipeline of semantic modules whose functionalities build upon each other: for example, first a milling module, then a heating module, then a stirring module, and lastly a cooling module. The precondition of the first module is "material in raw state" and its postcondition "material grounded". The precondition of the second module is "material grounded" and its postcondition "material heated up for stirring". Along with this there may be a parameter that can be manipulated in order to specify the temperature. The third module is for stirring with the precondition "material hot enough for stirring", with the same parameter as a threshold as in the second module, and with the postcondition "material stirred, ready for cooling down". The last module has the precondition "material ready for cooling down" and the postcondition "material in transportable status", possibly also with a temperature parameter. In this case, the "functionality" attribute in the semantic description may be used by the pipeline generation engine 104, which hence executes the matching and path-finding based upon the pre- and post-conditions with respect to the modules' functionalities.

The semantic modules selected by the pipeline generation engine 104 for inclusion in the suggested pipeline may correspond to real and/or virtual modules. Where at least one real module is included in the suggested pipeline, the pipeline generation engine 104 may function to prevent reuse (at least temporarily) of that real module in another manually or automatically generated pipeline. Thus, the pipeline generation engine 104 automatically accounts for shared operator activities while ensuring that a globally optimal solution for a generated pipeline may be found (as explained in more detail below).

In any of these ways, the system 100 provides for automatic generation of suitable/feasible pipeline suggestions for the plant operator concerning how to compose a new pipeline for a given purpose.

Although the pipeline generation has been described with reference to the module library 102 and its semantic data model, it will be appreciated that other sources and forms of data may be used to define modules as well as their inputs/outputs and functionality.

Pipeline Optimization Component

Referring again to FIG. 1, the automation engineering support system 100 may comprise a pipeline optimization component 106. The pipeline optimization component 106 is configured to: receive data identifying a required module type to be assembled into the modular plant as part of a module pipeline comprising one or more modules; and execute an optimization algorithm to select, from a plurality of modules in the module library 102 having the required module type, a module for inclusion in the module pipeline on the basis of one or more predetermined optimization criteria. The module pipeline generation engine 104 may be configured to generate a plurality of suggested pipelines for comparison according to one or more predetermined criteria. The pipeline optimization component 106 may be configured to compare or rank (using e.g. a ranking component) a plurality of pipelines (e.g. those suggested by the pipeline generation engine 104) according to one or more predetermined criteria. The optimization algorithm may be configured to perform a local optimization for optimizing only the said module pipeline, or a global optimization to select a plurality of modules of the required type to be assembled into respective module pipelines in the modular plant. The predetermined optimization criteria may comprise one or more of product quality; throughput; capacity; resource/material efficiency; energy efficiency; energy consumption; time-to-service; uptime; equipment availability; mean time between failure; utilization rates of services and equipment; minimization of module usage. In particular, where the collected usage data comprises previously measured key performance indicators, these may be used to determine an optimum or preferred selection and sequence of modules for transforming the precondition(s) into the postcondition(s) while satisfying the predetermined criteria.

Whether the pipeline is generated manually or automatically, it may be the case that the module library 102 comprises several semantic modules of a certain type from which a choice may be made regarding which one to select or which one is the best suited to a given purpose. For example, these exchangeable modules may have different characteristics, e.g., one module may be larger i.e. having a larger capacity concerning how much liquid it can distil, or one module may have less runtime left until it goes into service. Hence, when planning a production process, there will be the question as to which module to use. To this end, the pipeline optimization component 106 is configured to optimize the pipeline (where multiple unit choices are available) on the basis of one or more predetermined criteria. As mentioned above, each of the semantic modules in the module library 102 comprises a semantic description describing or representing the underlying module, whereby the underlying modules are enriched with real data which is semantically mapped in a structured way. The pipeline optimization component 106 is configured to use the module attributes contained in the semantic description to perform optimization.

Various optimization criteria that may be used by the optimization algorithm are envisaged by the present disclosure. The optimization criteria may correspond to, relate to, or be based on the contents of the above-described semantic description optionally including the collected usage data. Exemplary optimization criteria include: uptime, capacity, energy efficiency, energy consumption, maintenance intervals/cycles, time-to-service, the material or medium or type thereof most recently used in the unit, equipment availability, unit availability, unit schedule (when it will become available for reuse), the mean time between failure (MTBF) of the unit or of its equipment, utilization of the services and equipment (e.g. how often a valve is opened or closed), resource/material efficiency, minimization of module usage, or any other suitable KPI. The automation engineering support system 100 may furthermore store (e.g. in the same database) data relating to previously used module combinations indicating outcomes in terms of quality, throughput, efficiency, or other KPIs for the modular plant, to assist in assessing whether modules in a particular combination functioned together successfully. These criteria are used by the optimization component 106 to make intelligent and automated selections of the modules which are usable or best suited for the modular plant that is to be engineered or assembled. For example, data identifying which medium was flowing through the module may be used to determine whether extensive cleaning is needed before the module can be used in another plant. The collected usage data can be used in order to find the best possible module for the current planning according to the respectively chosen optimization criteria.

The pipeline optimization component 106 is configured to receive a pipeline, generated manually or automatically as described above and comprising one or more representations of real or virtual modules or types thereof. Selected optimization criterion or criteria are minimized/maximized over the set of modules in the pipeline by executing an optimization algorithm that makes use of semantic data describing different characteristics and constraints of the modules to optimize in relation to the selected criteria. The optimization algorithm is thus configured to find optimal module combinations for the pipeline. This may involve excluding one or more modules in the received (input) pipeline from the pipeline altogether, or replacing or exchanging these modules by alternative, more suitable modules. Based on the semantic description including for example collected usage data such as KPIs, the optimization algorithm finds module combinations that lead to, for example, the highest quality of the product, the highest throughput, the highest energy efficiency, etc.

The optimization algorithm may be implemented using a machine learning model trained to select modules based on their semantic description and optionally also on the basis of data indicating how well module combinations have performed in the past, e.g. which modules have been frequently selected in coexistence in the past and which have coexisted well together.

The optimization results can be visualized to the user optionally including an indication as to how the optimal configuration of modules was found. The user then selects the final configuration.

If more than one criterion is optimized, the result may be two or more locally optimal generated pipelines that are suggested to the plant operator in order to make a decision on which criterion is considered more important to be globally optimal. The pipeline optimization component 106 may again use ranking functionality (i.e. the ranking component) to rank the two or more pipelines according to selected or predetermined criteria.

The optimization may be a local optimization for only the given pipeline, or a global optimization indicating how to distribute the available module resources among several pipelines. For example, where a module has less runtime left until service, it may turn out that this runtime is still long enough for a planned batch production, so that, from a global optimization perspective, it would be better to use this module so that other similar modules which have more runtime left remain available for other possible batch production processes. Or, it may be the case that one module is flexible and could theoretically be used for many production processes, and that another exchangeable module which is more specialized would perform the same function, so that the global optimization suggests using the more specialized module in order to save the more flexible module for other possible processes where it might be needed.

The modules which are selected by the pipeline optimization component 106 may comprise real and/or virtual modules. For example, a virtual pipeline A may be preferred over virtual pipeline B since it consumes less energy in total, without reference to real module data being necessary for the optimization. However, in order to consider specific optimization criteria based on collected usage data, for example to ascertain whether a real module is actually available in the real unit pool or e.g. subject to maintenance, real modules may be selected.

Figure 4:
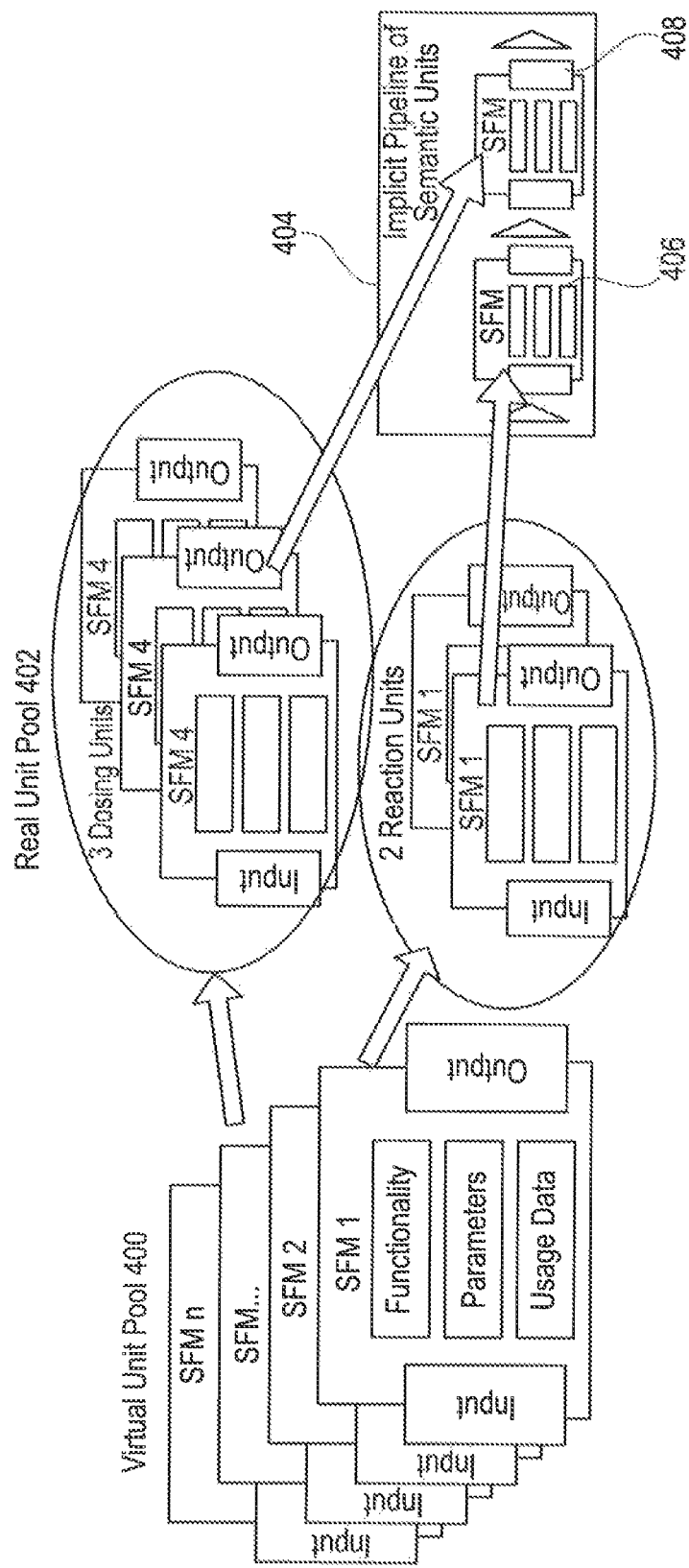
FIG. 4 illustrates optimization of an automatically generated semantic pipeline by the pipeline generation engine in accordance with the disclosure.

FIG. 4 illustrates one example of optimizing a semantic pipeline 404 of semantic modules using the pipeline optimization component 106. As shown in FIG. 4, the smart unit pool administered by the module library 102 comprises both a virtual unit pool 400 and a real unit pool 402. The virtual unit pool 400 comprises virtual units in the form of semantic function modules (SFM). As described above, in one non-limiting example, the SFMs may be represented by module type packages (MTPs) defining module types. Each module type appears in the virtual unit pool 400 only once (shown in FIG. 4 are module types SFM1-SFMn). The real units in the real unit pool 402 correspond to types found in the virtual unit pool 400 and may be associated with collected usage data. In this example, the plant operator owns multiple real units of different types, here 3 real dosing units, 2 real reaction units. In a first step, the implicit pipeline 404 is generated manually or automatically (as described above) using virtual units of certain types, and in a second step the pipeline optimization component 106 executes the optimization algorithm to replace these virtual units by representations of real units of the given types selected from the real unit pool 402 so as to prefer one real unit over another according to given optimization criteria. Optimization results are displayed to allow the plant operator to see different plant composition alternatives and their advantages and disadvantages. In the example shown in FIG. 4, the pipeline optimization component 106 identifies from the real module pool 402 two alternative reaction units (of the module type SFM1 selected as the first module of the pipeline) and three alternative dosing units (of the module type SFM4 selected for the second unit of the pipeline) which may be used to obtain a particular product. In this example, the pipeline optimization component 106 selects reaction unit 406 and dosing unit 408 for the pipeline 404, on the basis of the collected usage data stored in the semantic description of the respective semantic units together with the predetermined optimization criteria. For example, where the predetermined criterion is to maximize module uptime, the optimization algorithm may select the units 406 and 408 by reason of those units having a longer MTBF than the other candidate units, and/or a longer time until the next scheduled maintenance.

The pipeline optimization component 106 may additionally or alternatively function to optimize pipelines including semantic modules corresponding to real modules, for example those input by an engineer. In a further example of a local optimization scenario, in which a pipeline for an initial production plan made by the engineer includes a selected distilling module that is sized too large and thereby consumes too much energy, the pipeline optimization component 106 selects an alternative, smaller distilling module which suffices for the planned batch.

Although the pipeline optimization component 106 is described above in reference to the use of the semantic description including the collected usage data, which is described above as according to the semantic data model, it will be appreciated that data from any appropriate other source and in any appropriate format may be used for the optimization.

Simulation Component

Referring again to FIG. 1, to assist the plant operator in validating the selection of modules/pipelines, the automation engineering support system 100 may comprise a simulation component 108 or simulation tool configured to provide simulation functionality to allow simulation of the operation of a module pipeline comprising one or more modules in a modular plant (whether the pipeline is manually or automatically generated and whether automatically optimized or not), for example to identify possible bottlenecks and inefficiencies, try out alternative modules to determine if this optimizes the simulation, or generally to simulate 'what-if' scenarios. For example, the planning may start with an initial process map in the form of a pipeline manually generated by the user to represent modules and how they are connected, to define what kind of process the user has in mind. This pipeline is most likely not optimal. The user may utilize the simulation component 108 to simulate different what-if scenarios in order to uncover sub-optimal configurations. For example, the user may simulate what happens if an alternative distilling module is used instead of the currently selected distilling module which is much larger, or which has a much longer time-to-service. The simulation component 108 may be configured automatically to simulate different what-if scenarios (i.e. alternative configurations/permutations and compare the results. The number of scenarios may in practice depend for example on the time which the planner wants to invest in simulation.

Feedback Processing Component

Referring yet again to FIG. 1, the automation engineering support system 100 may further comprise a feedback processing component 110. The feedback processing component 110 may be configured to modify the operation of one or more other components 104-108 of the automation engineering support system 100 based on user feedback. Users may be plant owners or plant operators, automation engineers, maintenance personnel, development team members, service-team members, and so on.

The feedback processing component 110 may be configured to receive user feedback on module or pipeline rankings provided by the pipeline optimization component 106 and to use the user feedback to provide improved rankings of subsequently-generated pipelines. As mentioned above, the pipeline optimization component 106 may be configured to rank pluralities of candidate modules or pipelines according to predetermined optimization criteria. In particular, the feedback processing component 110 is configured to provide the user feedback along with the generated pipelines to which that user feedback relates as training data to a machine learning model, to train the model using that training data, and to generate improved rankings using the trained model. The user feedback in this case may comprise, for example, a modification to, or re-ranking of, the generated ranking.

Figure 6:
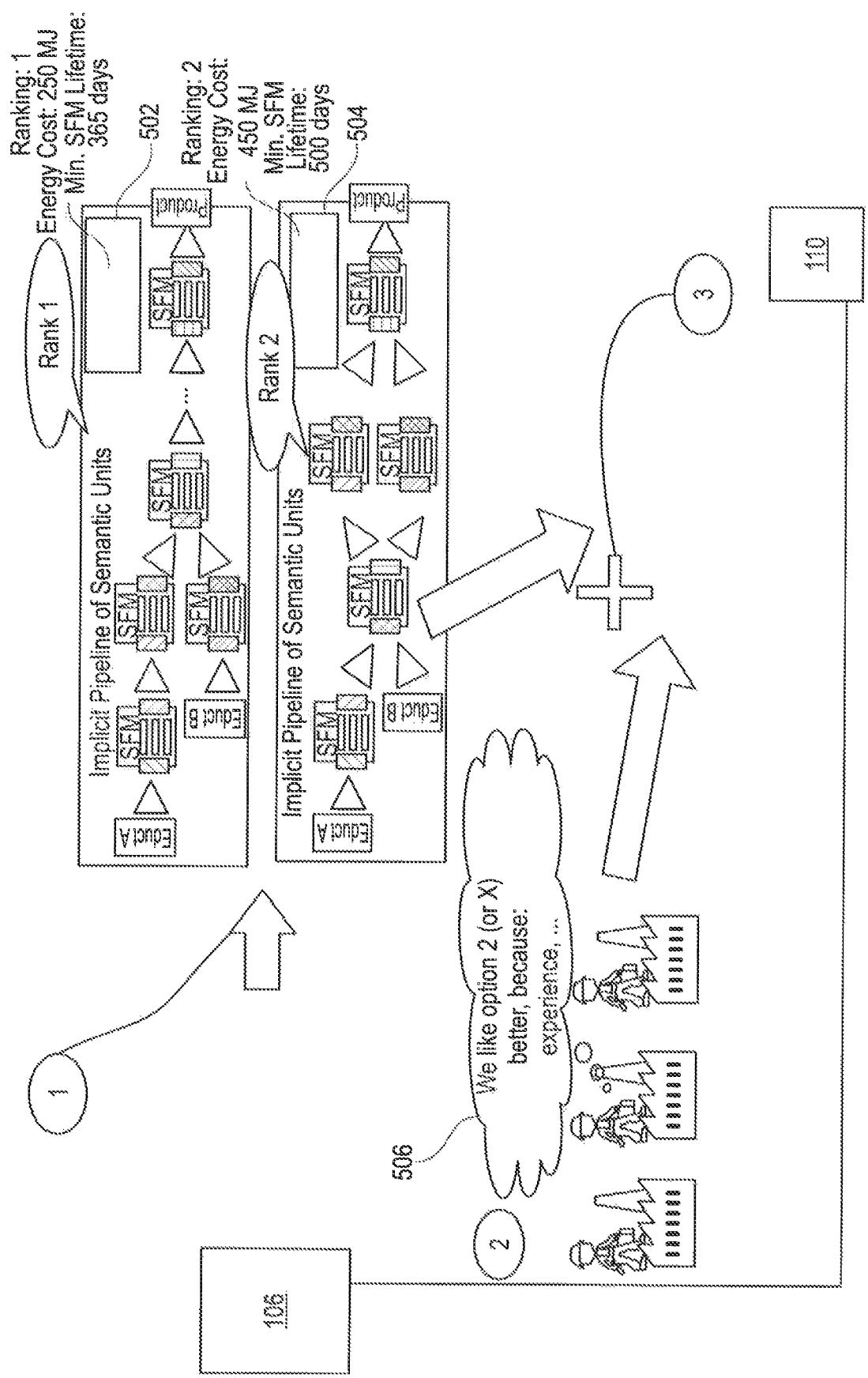
FIG. 6 illustrates the learning of pipeline rankings in accordance with the disclosure.

FIG. 6 illustrates the feedback processing component 110 being used to train a machine learning model to provide improved rankings of pipeline suggestions generated by the pipeline generation component 104. In step 1, the optimization component 106 generates a ranking of the generated pipeline suggestions according to one or more predetermined criteria, in this case the KPIs energy cost (in Joules) and Minimum SFM Lifetime (in days). FIG. 6 shows two generated pipeline suggestions 502, 504 for which a ranking was obtained in this way. In step 2, the users (in this example, the plant owners of three modular plants) provide user feedback 506 on the ranking. In the example, the users prefer the second ranked pipeline suggestion 504 and state the reasons (justifications along with dependencies or relations or relevant data) for the preference. In step 3, the pipeline suggestions 502, 504 together with the user feedback 506 are input by the feedback processing component 110 as training data to a machine learning model, to train the model to generate rankings which better satisfy the user's preferences.

In one specific non-limiting example of training the model, the optimization component 106 ranks a set of two alternative pipelines for chemical plants according to the given/suggested optimization criteria, energy cost and minimum SFM lifetime or time-to-service, similar to the above example. Yet, the optimization component 106 and its underlying algorithms, including the ranking algorithm, do not yet include the expert knowledge (which plant owners might have), that especially for chemical plants failure safety in terms of module parallelism is highly preferable. Hence, these chemical plant owners provide the feedback that the second-ranked pipeline in the above example would still be preferable (since it contains two modules of the same type and with the same functionality, which makes production more reliable and more failure-safe (i.e., one of the two modules could break, but the other one would still work and could keep the process alive, even if on a lower throughput rate)). Hence, the human-understandable justification in this example includes the information about additional expert knowledge in terms of an important not-yet-mentioned KPI for a specific plant type (chemical plant) to be considered and strongly weighted from now on in the future for all plants of this type. The data and labels necessary to implement and enforce this updated ranking behaviour, i.e., training data, would include the previously obtained initial rankings for the two alternative pipeline suggestions 502 and 504, and the updated rankings that relate to these two alternative pipelines, yet of course not only for this example but for many examples, so that the ML component can recognize the pattern "two or more parallel modules of the same type are always preferable for chemical plants". Once recognized by the ML component, it finally becomes part of the ML model, i.e., part of the updated ranking algorithm.

The feedback processing component 110 may be configured to use explainable AI (X-AI). In the above specific example, the human-readable statement, "if we are dealing with a chemical plant, then module parallelism is preferable", which corresponds to the above-mentioned machine-learned/recognized pattern, may be provided as the X-AI reasoning support or explainable-AI justification. The feedback processing component 110 may be configured to obtain such explanations using suitable known X-AI methods. One non-limiting example may use decision trees, which are inherently explainable, since all forks in the tree can be traced back to an if-else-statement), but it will be understood that other methods are envisaged by the present disclosure.

In this way, the model may be continually updated based on newly-received user feedback used as training data. Learning to rank modules or pipelines in this way may simplify the process of generating pipelines for the modular plant, alleviating the task for the automation engineer, and allowing transparent and evidence-based ranking suggestions to be provided, thereby building trust in the system 100. Broadly speaking, the optimization component 106 may be configured to analyse module or pipeline performance in the plant and suggest better pipelines based on at least two categories of information: that is, not only on information including explicit justifications (such as the statement, "if we are dealing with a chemical plant, then module parallelism is preferable") but also on heterogeneous data/evidence from which a pattern may be recognized and inferred (referring again to the above example, for the same statement this would be the data/labels with respect to the two above-mentioned alternative pipeline suggestions).

In another example, the feedback processing component 110 may be configured to use the user feedback, not to modify the rankings, but to provide supplementary information accompanying a ranking, for example in the form of a 'transparent suggestion'. A transparent suggestion may comprise both a ranking in addition to previous user feedback regarding that ranking or a similar ranking. More particularly, the transparent suggestion may take a form such as "We would rank the automatically generated pipelines as follows . . . But other automation engineers or plant owners did use a XYZ module at this point . . . and obtained an even higher ranked pipeline." Referring to the same example as given above in relation to FIG. 6, the transparent suggestion is intended to reveal and bring to light the recognized pattern (i.e. the statement, "if we are dealing with a chemical plant, then module parallelism is preferable"). Hence, the transparent suggestion in this non-limiting example, the transparent suggestion could appear as follows:-

"We would rank the automatically generated pipelines with rank 1 and rank 2, according to your (i.e. the plant owners') optimization criteria (i.e. here: energy cost and minimum SFM lifetime/time-to-service). But other automation engineers or plant owners followed the pattern 'if we are dealing with a chemical plant, then module parallelism is preferable' at this point, such that an enhanced/improved evidence-based ranking would be: 'pipeline with rank 2 is even higher ranked pipeline'."

Figure 7:
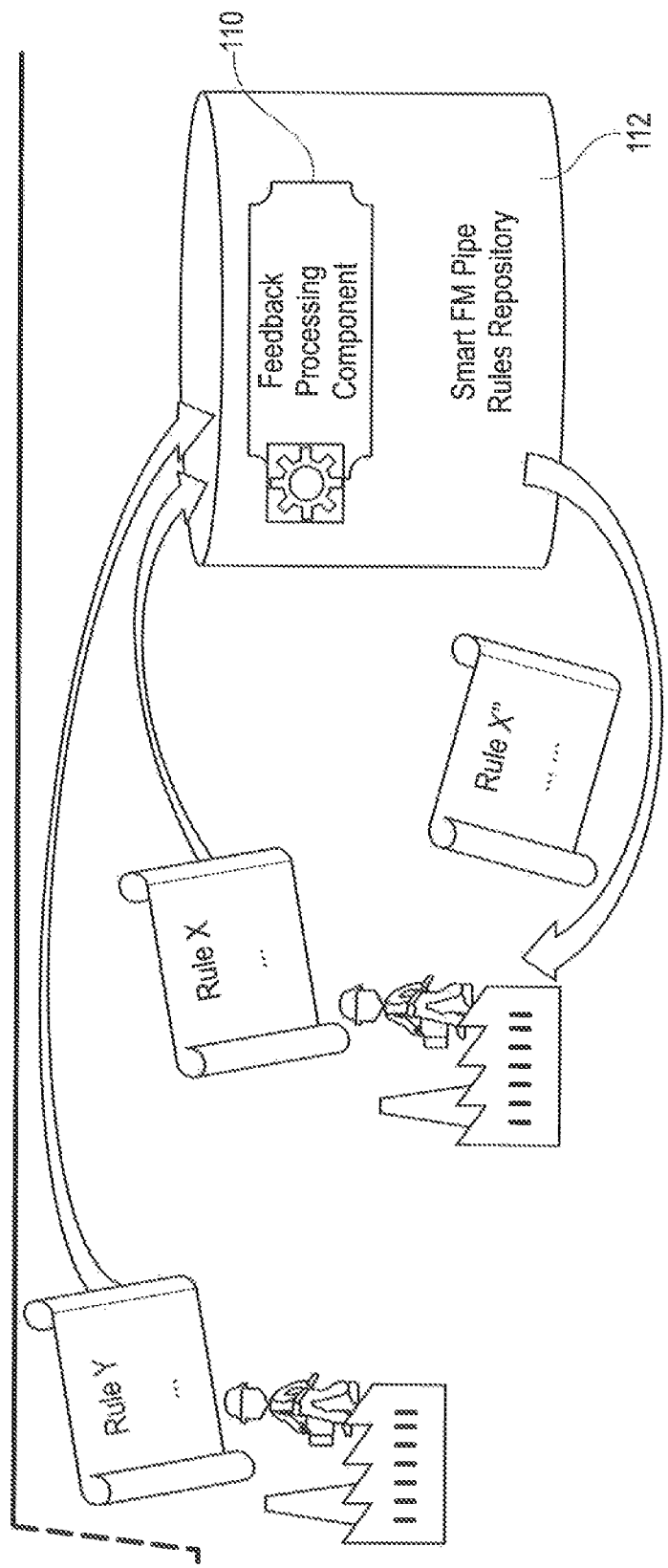
FIG. 7 illustrates the updating of a rules repository in accordance with the disclosure.

The feedback processing component 110 may be configured to adapt, based on user feedback, the algorithm used by the pipeline generation engine 104 to generate suggested pipelines. As described above, the pipeline generation engine 104 may operate using a rule-based algorithm configured to implement expert rules for generating pipelines. The feedback processing component 110 may be configured to allow the rule-based algorithm to be adapted based on the user feedback. For example, the feedback processing component 110 may be configured to facilitate the addition of new rules, the amendment of existing rules, or the deletion of rules (in a list of rules or in a rules repository 112). The rules in the rules repository 112 may comprise formalised dependencies alongside the rules which may be edited in the same way. FIG. 7 illustrates the rules repository 112 being updated based on user feedback. In the example shown, the feedback processing component 110 receives feedback from one user requesting the addition of Rule Y to the rules repository 112. Another user requests that Rule X be amended to Rule X". Examples of rules which could be added or amended include for instance: use a similar/the same nominal pressure or tank size or I/O connection/port; or dose first, then mix and heat, thereafter store and cool; or, if a reactor module has two of the same input terminals/connections, then it needs two of the same dosing modules for two educts.

The rule-based algorithm may be adapted based on direct user feedback requesting the said action. For example, user suggestions may be received from users such as admin, developers, vendors. Such suggestions may be approved, validated, ranked, and/or weighted by the suggesting users themselves, by other users, by a human administrator of the repository 112, or automatically by the feedback processing component 110. Additionally or alternatively, adaptations to the rule-based algorithm may be inferred based on modifications made to the generated pipelines by the user. Such adaptations may be inferred manually by administrators, developers, vendors and so on analysing the said modifications, or automatically by the feedback processing component 110.

The feedback processing component 110 may be configured to adapt the rule-based algorithm only in response to receiving confirmation of the adaptation. Confirmation may be manual and/or automatic. For example, the feedback processing component 110 may be configured to prompt a user, for example an administrator of the repository 112, manually to confirm a suggested adaptation based on their expert/domain knowledge. Additionally or alternatively, the feedback processing component 110 may be configured to confirm an adaptation automatically by waiting for a predetermined number of users to provide the same suggestion or similar suggestions before processing the requests. For example, a new rule may be added automatically as soon as 5 or more users have requested its addition. Similarly, an existing rule may only be amended when the adaptation is manually confirmed (e.g. based on our expert/domain knowledge including determining which feature was not yet included in the rule definition) or automatically in response to several independent users requesting the same amendment.

In the case that the feedback processing component 110 is configured to adapt the rule-based algorithm based on user-suggestions (e.g. new rules or amendments to rules), the feedback processing component 110 may be further configured to process one or more countersuggestions before adapting the rule-based algorithm. By "countersuggestion" is meant a second suggestion which is at least partially inconsistent with a first suggestion. For example, a countersuggestion may comprise an opposite or different modification to the rule-based algorithm than what was suggested by the first suggestion. Thus, the feedback processing component 110 may be further configured to determine which adaptations are to be made in the presence of countersuggestions to one or more suggestions of those adaptations. The determination may be made manually or automatically. For example, the feedback processing component 110 may be configured to prompt a user, for example an administrator of the repository 112, manually to confirm a suggested adaptation based on their expert/domain knowledge, in response to receiving one or more countersuggestions to a suggestion of the said adaptation. To allow time for countersuggestions to be received, the feedback processing component 110 may be configured to delay adaptions based on user suggestions for a predetermined time period. Additionally or alternatively, the feedback processing component 110 may be configured to confirm an adaptation automatically by employing a weighting mechanism. For example, the weighting mechanism may be configured to count the number of same or similar suggestions and the number of countersuggestions, and to adapt the rule-based algorithm accordingly only if the number of same or similar suggestions outweighs the number of countersuggestions by a predetermined factor, e.g. 5 or so, in order to validate/approve the adaptation. One or more similarity metrics may be used to determine or recognise when suggestions are the same as, or similar to, other suggestions.

User amendment of the rules in this way allows for ever-improving pipeline suggestions to be generated that take into account restrictions impacting the plant such as general pipeline feasibility and practicality, ease of use, conventions, and so on. In some variations of the above examples, adaptations to the rule-based algorithm may be made during production, or to rules deemed critical, only in response to manual confirmation.

The feedback processing component 110 may be configured to facilitate amendments of the semantic data model based on user feedback. In particular, the feedback processing component 110 may facilitate expansion of the semantic data model based on the user feedback. The user feedback may comprise a suggestion to add one or more elements to the semantic data model. The feedback processing component 110 may be configured to facilitate amendment or expansion of the semantic data model to include the suggested elements. Any element of the semantic data model as described herein may be added, including for example relationships (between e.g. inputs and outputs, or between functionalities and processed materials), module features, KPIs, categories, tags. Allowing the semantic data model to be amended in this way keeps it extensible, enabling it to reflect (by means of respective weights and importance rankings) a wider domain expertise and understanding of real, practical plant environments.

The model may be expanded by adding the suggested element to an existing list of elements of the same type. For example, a KPI catalogue of the semantic data model may be expanded by adding a user-suggested KPI. Additionally or alternatively, the semantic data model may be expanded by introducing new types of elements. For example, if the semantic data model covers only energy values and tube connections, it may be expanded to include process-technical, procedural experience values or empirical values. This might be, e.g., forward pressure from a module to another subsequent one, or, e.g., a valve can only be opened stepwise and cannot facilitate a direct open/close state even if the previous module provides it with input materials, or, e.g., the volume-temperature-pressure-relation of a reactor officially allows x-y-z-values, but in practice it is preferred and recommended to only use it to 90%-workload/utilization.

The feedback processing component 110 may be configured to allow the user to edit (e.g., add or amend) features used by the pipeline optimization and/or ranking algorithms described herein. The automation engineering support system 100 may maintain a list, database, or catalogue of optimization criteria or KPIs for this purpose. The feedback processing component 110 may be configured to allow the user to edit this criteria catalogue. Weightings for features may be used based on the user's KPI importance selection. In one non-limiting example, if the user wants to focus on energy efficiency, they may instruct the ranking algorithm to attach a higher weight to all KPIs that relate to energy costs. In another non-limiting example, the user may suggest to add/include a KPI to focus on "pragmatic handiness and manageability", in order to attach higher ranks to a pipeline that contains "modules on casters", for example. Here, the "handiness" could be the KPI to be added to the criteria catalogue and the ranking algorithm may then accordingly attach a higher rank to a pipeline containing a "module on casters" when the user commands the ranking algorithm to put the KPI "handiness" in focus. In another non-limiting example, the user may suggest KPIs to depict that several procedures would be suitable for an intended process (e.g. different focusses in different industry sectors), yet the differences have not yet been depicted/defined in the semantic data model. This might be used for instance, as in the above mentioned example, to represent module parallelism as a preferable feature (based on the reliability-KPI or module-parallelism-KPI) of a pipeline. In a further non-limiting example, the user may add sector-specific or use-case-specific elements or element types to the semantic data model. For example, oil & gas sector users may add KPIs to focus on continuous running or maintenance, whereas e.g. pharma sector users may add KPIs to focus on precision (e.g. no changes or outliers to the batch process), and e.g. energy-intensive sector users may add KPIs to focus on energy cost/energy efficiency, for example so that no peak currents occur.

In the case that the feedback processing component 110 operates globally or sub-globally, the semantic data model may be amended only in response to a predetermined minimum number of users suggesting the same amendment, for example new features or KPIs may be integrated only when suggested by 5 or more independent users (e.g. clients, automation engineers, plant owners, and so on), so it may be assured that the amendments are important and not outliers or seldom or special wishes.

In one example, the feedback processing component 110 may operate in a plant-focussed manner, i.e., personalized to the respective plant owner. In other examples, the feedback processing component 110 may operate globally across multiple plants or sub-globally across plants in a particular domain (e.g. chemical plants, mining operations) for wider coverage of best practices.

In sum, the feedback processing component 110 provides a wrap around the other components 104-108 of the automation engineering support system 100 thereby facilitating an extensible, learning, ever-improving automated pipeline generation and optimization system, which continually adapts to real use cases and application fields in response to the user's assessments of its output.

Applications

The automation engineering support system 100 as described herein could be provided as one of the following:

As a central unit pool provided to multiple plant operators. The central pool comprises a collection of semantic modules corresponding to modules previously used by the plant operators and including semantic descriptions along with usage data collected from the commissioned plants. Not only local, unit-centric optimization but also global, unit-in pipeline-context optimization is thus facilitated. This solution may be cloud-based, scalable and easily accessible.

As a private unit pool managed by the plant operator. The private unit pool allows the plant operator to manage and administer a collection of semantic modules corresponding to real modules owned by the plant operator. Parameters, KPIs and other collected usage data (best practices, calibrated parameter combinations, maintenance intervals, MTBF, last maintenance done, last material used, clean or not, active/available/unused, etc.) are gathered from the real modules and uploaded to the database to allow for application of the system's pipeline generation engine and optimization component. Both an on-premise implementation as well as a cloud-based solution are possible, depending on the wishes/requirements of the plant operator.

As an in-house product in order to reduce the plant operator's costs, or as an offer to clients to reduce their own cost.

The subject-matter described herein may find particular application in module-based production and resource planning. Especially in pharmaceutical batch production with small batch sizes, module resources are frequently exchanged between different batches. When planning a new batch, or when re-engineering the module setup of an existing batch production (e.g. because the production load has changed so that the selection of existing modules seem to pose some bottlenecks), the subject-matter described herein will allow the planner to identify and select the right i.e. best suited modules.

The subject-matter described herein may find further application in module maintenance planning. Modules need to be maintained from time to time and have characteristics such as "time-to-service" that indicate how many runtime hours are left until the next planned inspection service. Here, optimization and what-if simulation can assist in determining an optimal maintenance plan for modules. For example, with help of the known production plan specifying how different modules will be used in the near future, an example optimization scenario would be to undertake maintenance of a module earlier than planned, because it is not used then, which turns out to have a better utilization and process output in the end.

Thus, the benefits offered by the automation engineering support system 100 as described herein include—among others—(1) re-use of modules and consequential reduced engineering effort through a searchable module pool; (2) simplified or automatic generation of feasible pipelines that are (i) directly compatible by means of semantic checks and controls and (ii) capable of being optimized with respect to miscellaneous criteria such as uptime, maintenance intervals, availability, etc.

Control Engineering Support System

While the automation engineering support system 100 focusses on supporting the automation engineer (during the automation engineering or commissioning phase), the control engineering support system 150 focusses on supporting the control engineer (i.e. the operator or production planner during the operation phase). Referring back to FIG. 1, the control engineering support system 150 comprises one or more of: an execution and control engine 152; a plant optimization component 154; a quality control component 156; a certification component 158.

Execution and Control Engine

The control and execution engine 152 provides for automated semantic pipeline execution functionality so that the system can tune, control and/or execute itself. The execution and control engine 152 is configured to operate using the same semantic data model as the automation engineering support system 100 and hence may operate using the semantic pipelines and the semantic data as described herein. The execution and control engine 152 can also access data from real module (e.g. function module) instances in the commissioned pipeline in the modular plant. To this end, the control and execution engine 152 may be configured to receive data from plant-based monitoring infrastructure (comprising e.g. sensors and other reporting devices), so the plant pipeline execution can be monitored in real-time and data fed to the software-based control and execution engine 152. The control and execution engine 152 may be configured to translate or interpret the data it receives from the monitoring infrastructure into data that conforms to the semantic data model. The control and execution engine 152 is configured to run a pipeline which may or may not have been generated in the manner described above and subsequently commissioned. The control and execution engine 152 may perform some or all of the functions of a manufacturing execution system (MES) and may therefore be configured to perform functions in real time including for example scheduling and resource allocation, dispatch and execution of production orders, collection of production data, and production analysis, in order to oversee, execute, and/or control, the transformation of the educt(s) into the product(s). The control and execution engine 152 may be configured to track and document the process to record captured data, processes and outcomes of the process. The control and execution 152 performs these functions using data which conforms to the semantic data model.

Referring once again to the above-described example involving a purification process module with a service "PURIFY" which requires liquid steel as input, this precondition may be represented under the semantic data model by way of the four-dimensional condition vector [0,76,2, -] describing the required input attributes. Here, the attributes in the zeroth-third dimensions respectively represent the type of attribute (0=material), material ( 6=steel), aggregate-state (2=liquid), and durability (-=no condition applies). The control and execution engine 152 is configured to start the module service "PURIFY" immediately in response to input material described by the vector [0,76,2, -] being present or detected at the input tube of the module. In another non-limiting, in which a first module requires two (possibly different) inputs that come from second and third (possibly different or parallel) modules (for example as shown in FIG. 5), the control and execution engine 152 may command the first module to execute only after (but as soon as) both the second and third modules have provided outputs which correspond to the input precondition of the first module.

Further specifiers in the n-dimensional condition vectors may be used to represent services exposed by the modules, thereby providing a semantic description of these services. Specifiers of the n-dimensional condition vectors may be used to differentiate between services such as "module run", "service run", "state model run", and "xCE run", and so on. These specifiers may further discriminate between situations in which "module run" corresponds (or not) to "service run" or thus (not) to "state model run". Information describing the module services may be gleaned from the state model (including e.g. cause-and-effect matrices) where needed. Yet further specifiers may be used to distinguish between parallel and sequential execution of services. For instance, a module that provides the functionality of having n services run in parallel might have a specifier "parallelism on service level supported", and the parallelizable services could obtain a respective flag or annotation indicating with which other services they can run in parallel. Some modules may allow for parallel execution of services, whereas others do not. For example, PackML only allows one service or one finite state machine/automaton per unit. Still further specifiers may be used to represent interdependencies between services. These specifiers could build on a xCE matrix or also use other formal description techniques. The xCE is described for example in "Technik-Kommunikation leicht gemacht: Cause-and-Effect-Diagramm als Losungsansatz", by Katharina Gohr et al, atp edition, 1-2/2014. This may be useful in cases of sequentiality or parallelism or concurrency.

Figure 5:
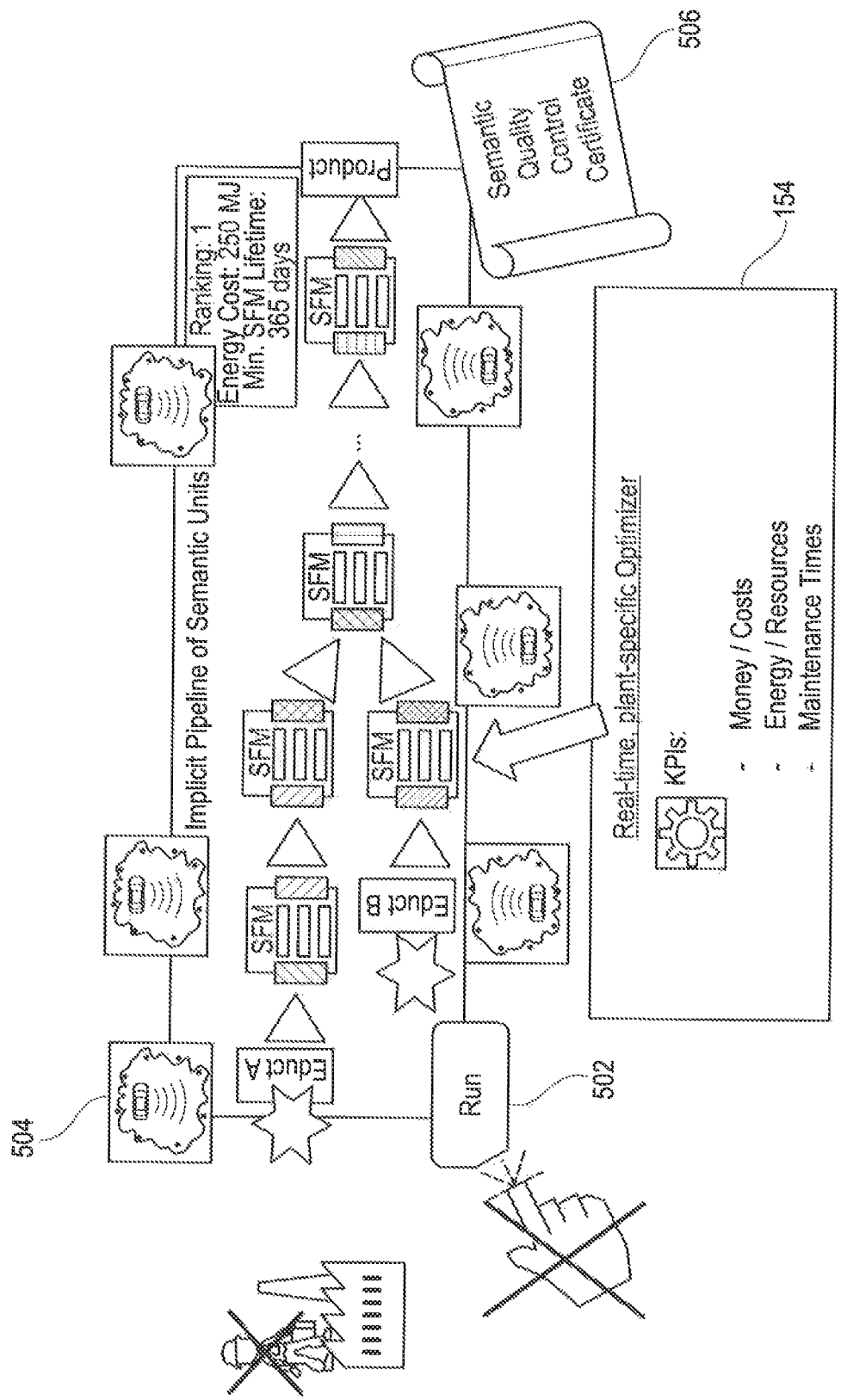
FIG. 5 illustrates plant operation optimization in accordance with the disclosure.

The control and execution engine 152 may be configured to run the pipeline in response to a start command or approval received from a human operator (for example by clicking on a "Run" button 502, as shown in FIG. 5), or it may be configured for self-execution, beginning when respective inputs are available, when maintenance intervals are satisfied, or depending on other optimization criteria that are automatically checked. This could for instance also be scheduled or just-in-time-production of, e.g., pharmaceutical or perishable products, where the final, e.g., reaction process in the reaction module should be as late as possible, but just in time for logistics.

The control and execution engine 152 thus facilitates control engineering, operation and production planning. The control and execution 152 thus provides for autonomous or semi-autonomous plant pipeline operation supporting or replacing the human operator and production planner. It reduces the need for production scheduling features, and allows for simpler production scheduling functionality on upper automation levels. It mitigates or eliminates the need for an IVIES and scheduling operations.

Plant Operation Optimization Component

The plant operation optimization component 154 is configured to perform real-time, multi-factor, plant-specific optimization using data collected from the modular plant (e.g. from sensors 504, as shown in FIG. 5) or other KPIs to further optimize its execution. The collected data and KPIs once again conform to the semantic data model. KPIs which may be optimized include for example costs, energy/resources, and maintenance times. In one example of optimizing plant operation in terms of energy costs, the plant operation optimization component 154, knowing that a certain amount of product X shall be produced through a specific pipeline Y, that the pipeline Y needs e.g. 20 minutes to produce the product, and that the delivery date is tomorrow, the plant operation optimization component 154 may instruct the control and execution engine 152 to wait until night-time, when energy costs are lower. When using multiple factors, a user-specified indication of relative importance may be received and used in the optimization. For example, the plant owner may specify relative importance by providing a weighted list of KPIs/factors, with the plant operation optimization component 154 being configured to compute the overall cost of the pipeline alternatives and of their scheduled execution accordingly. With respect to the semantic data model, the cost of a pipeline may be computed as $$\text{cost}(Pipe_i) = p_i \sum_{j=1}^{m} \left( \mu_j \sum_{k=1}^{n} v_i c_{jk} \right) = p_i (\mu_1 \ \ldots \ \mu_m) \begin{pmatrix} v_i c_{11} & \ldots & v_i c_{1n} \\ \vdots & \ddots & \vdots \\ v_i c_{m1} & \ldots & v_i c_{mn} \end{pmatrix},$$

$$\text{and } \text{cost}(Pipe_{opt}) = \min_i |\text{cost}(Pipe_i)|$$

with k=1 ... n going over all SFMs in a respective pipeline, j=1 ... m going over all types of costs (e.g., for energy, next maintenance due date, or $CO_2$-emissions), and i going over all pipeline alternatives, such that c multiplied by v describes the SFM's cost c with respect to the processed amount or volume v of material, weighted by the respective cost KPI importance μ, whereby plant owners may specifically weigh and rank the importance and strength of the KPIs with respect to one another. Additionally, a penalty factor $p_i$22 1 (with $p_i$=1 by default) can be chosen to punish a pipeline, e.g. based on knowledge in the ontology, in order to, for instance, account for environmentally unfriendly or legally banned procedures in certain regions. The optimal pipeline is considered to be the one from all potentially feasible pipeline alternatives with the cheapest overall cost (with respect to the given KPI weights). Some parameters may be functions of time and others may be constant. For example, varying prices for electricity throughout the day may mean that the energy cost could be a function c=f(t), which may resemble an elevated sine function with high prices during daytime and lower prices during the night. Consequently, the cost(Pipe$_i$) may also depend on time, and the overall minimum would not only depend on the chosen pipeline but also on the respective time of execution.

The optimization can be global, sector- or domain-specific (e.g. only for oil & gas plants but not for pharma plants), or plant-specific.

Quality Control Component

The quality control component 156 serves as an automated semantic quality control system that can automatically assess or monitor the semantic results obtained from the pipeline and their quality, for example to guarantee that the quality of an interim or final product falls within a predetermined tolerance or satisfies a certain threshold. For instance, the quality control component 156 may be configured to check that a pH value of product X is correct within a certain tolerance. The pH value is represented by a specifier within an n-dimensional condition vector conforming to the semantic data model. In one non-limiting example, an acidic liquid material may be represented semantically using the condition vector [0, 32, 2, -, 1.87 (+/-0.5 )], where the attributes in the zeroth-fourth dimensions respectively represent the type of attribute (0=material), material (32=sulphuric acid), aggregate-state (2=liquid), durability (-=no condition applies), and pH-value (pH-value=1.85 with a tolerance of +/-0.5, meaning from 1.35 to 2.35).

Certification Component

The certification component 158 serves as an automated semantic quality control certification system that can create a certificate or protocol of the automated quality control. FIG. 5 shows a semantic quality control certificate produced by the certification component 158. The quality control certificate can be derived directly from the setup of the modules/SFMs, assuming this to be correct. In other words, if the SFMs are correctly set up and calibrated, i.e., their I/O pre/post-conditions are correct, e.g., with respect to pH-Value, durability, temperature, pressure, etc., then the final outcome product will be exactly known, since the pipeline execution and control component 152 will execute exactly what has been specified as the pipeline with the respective modules.

The control engineering support system 150 thus provides high transparency of automation and control engineering support using the semantic data model and evidence-based, reactive algorithms, and may be used to complement the automation engineering support system in a way such that both the automation engineer and control engineer are supported. Of course, it will be appreciated that the two systems may also exist independently.

Figure 8:
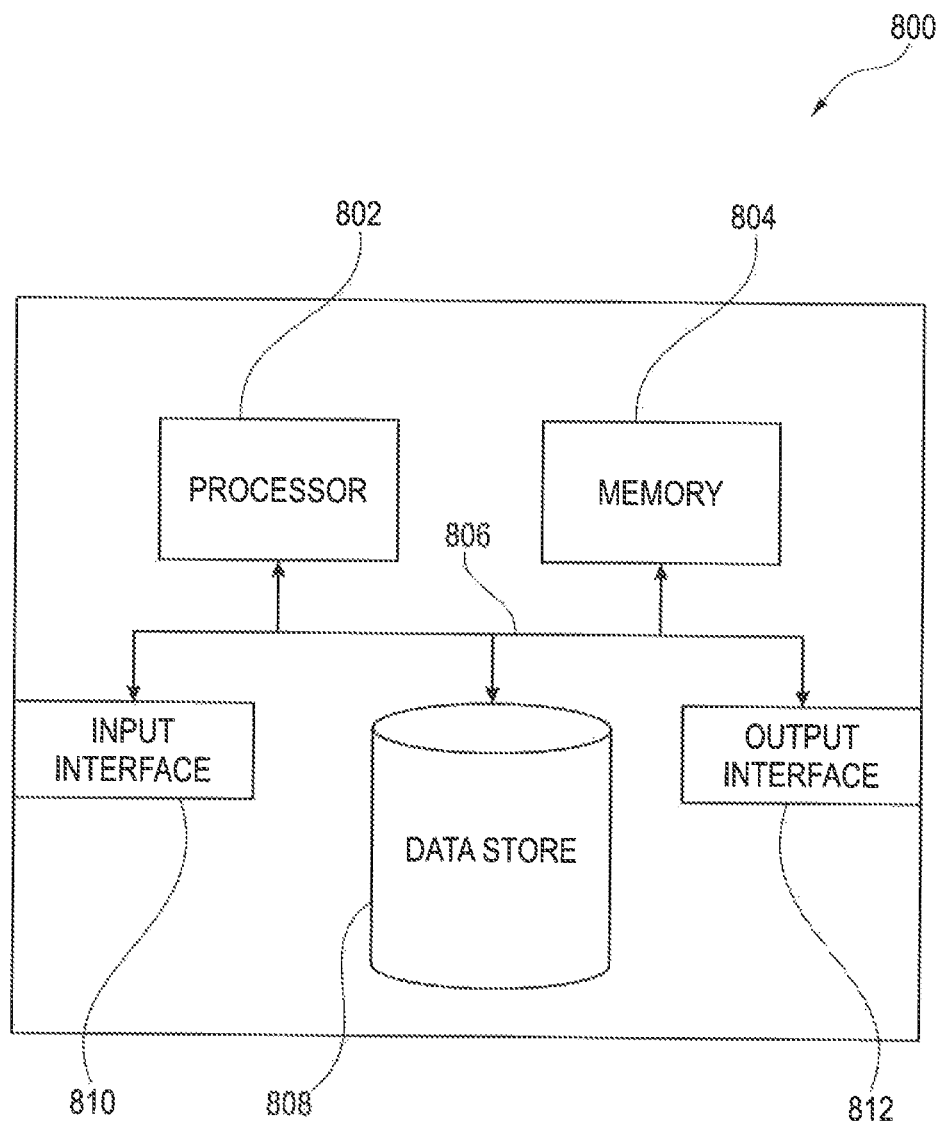
FIG. 8 illustrates a computing device that can be used in accordance with the systems and methods disclosed herein.

Referring now to FIG. 8, a high-level illustration of an exemplary computing device 800 that can be used in accordance with the systems and methodologies disclosed herein is illustrated. In particular, the computing device 800 may be used to implement the above-described modular automation support system 10. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The data store 808 may be used to implement the above-described module library 102 and its database.

The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812. It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although the above description is provided in the context of the MTP standard, it will be understood that the present disclosure is not limited to the use of MTP in defining units and that other standardized module descriptions may be used.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used advantageously. A computer program may be stored/distributed on a suitable medium, such as an optical storage medium or a solid-state medium supplied together with or as part of other hardware, but may also be distributed in other forms, such as via the internet or other wired or wireless communications systems.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An automation engineering support system comprising:
a feedback processing component configured to modify the operation of one or more other components of the automation engineering support system based on user feedback;
a pipeline generation engine configured to receive input data indicating at least one precondition and at least one postcondition of a required pipeline for a modular plant, and to generate a plurality of suggested module pipelines each comprising one or more modules capable of transforming the at least one precondition into the at least one postcondition; and
a pipeline optimization component configured to rank the plurality of pipelines generated by the pipeline generation engine according to one or more predetermined criteria. wherein the feedback processing component is configured to receive the user feedback on the pipeline rankings provided by the pipeline optimization component and to use the user feedback to provide improved rankings of the pipelines subsequently generated by the pipeline generation engine, and wherein the feedback processing component is further configured to provide the user feedback and the generated pipelines to which the user feedback relates as training data to a machine learning model, to train the model using that training data, and to generate improved rankings using the trained model.

2. The automation engineering support system of claim 1, wherein the user feedback comprises a modification to a generated ranking.

3. The automation engineering support system of claim 1, wherein the feedback processing component is configured to adapt, based on the user feedback, an algorithm used by the pipeline generation engine of the automation engineering support system to generate the plurality of suggested module pipelines.

4. The automation engineering support system of claim 3, wherein the algorithm used by the pipeline generation engine to generate the plurality of suggested module pipelines comprises a rule-based algorithm configured to implement expert rules for generating the pipelines, wherein the feedback processing component is further configured to facilitate the addition of new rules, the amendment of existing rules, or the deletion of rules in a rules repository used by the pipeline generation engine based on the user feedback requesting or inferring the said action.

5. The automation engineering support system of claim 1, wherein the automation engineering support system uses a semantic data model for providing abstract representations of modules. module pipelines, or module plants, and wherein the feedback processing component is further configured to facilitate amendments to the semantic data model based on the user feedback.

6. The automation engineering support system of claim 5, wherein the user feedback comprises a suggestion to add one or more elements to the semantic data model, and wherein the feedback processing component is configured to facilitate amendment of the semantic data model to include the suggested elements.

7. The automation engineering support system of claim 5, wherein the feedback processing component is configured to facilitate amendment of the semantic data model by adding the suggested element to an existing list of elements of the same type.

8. The automation engineering support system of claim 5, wherein the feedback processing component is configured to facilitate amendment of the semantic data model by introducing new types of elements suggested in the user feedback.

9. The automation engineering support system of claim 5, wherein the feedback processing component is configured to allow the user to suggest sector-specific or use-case-specific elements or element types for inclusion in the semantic data model.

10. The automation engineering support system of claim 5, wherein the feedback processing component operates sub-globally across plants in a particular domain.

11. The automation engineering support system of claim 10, wherein the feedback processing component is configured to grant permission to amend the semantic data model only in response to a predetermined minimum set of criteria being met.

12. The automation engineering support system of claim 1, wherein the automation engineering support system is further configured to maintain a catalogue of optimization criteria for use by the pipeline optimization component, wherein the feedback processing component is configured to allow the user to add or amend criteria in the catalogue.

13. The automation engineering support system of claim 1, wherein the feedback processing component operates in an industrial process plant.

* * * * *